E. SHAW.
AUTOMOBILE TOP.
APPLICATION FILED OCT. 28, 1919.
1,373,207.
Patented Mar. 29, 1921.
2 SHEETS—SHEET 1.
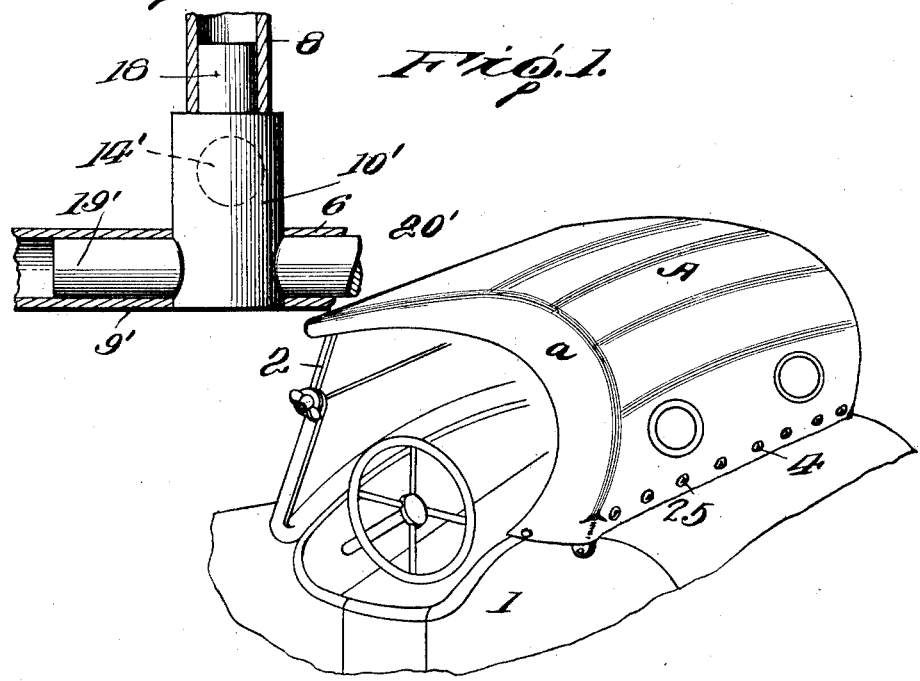
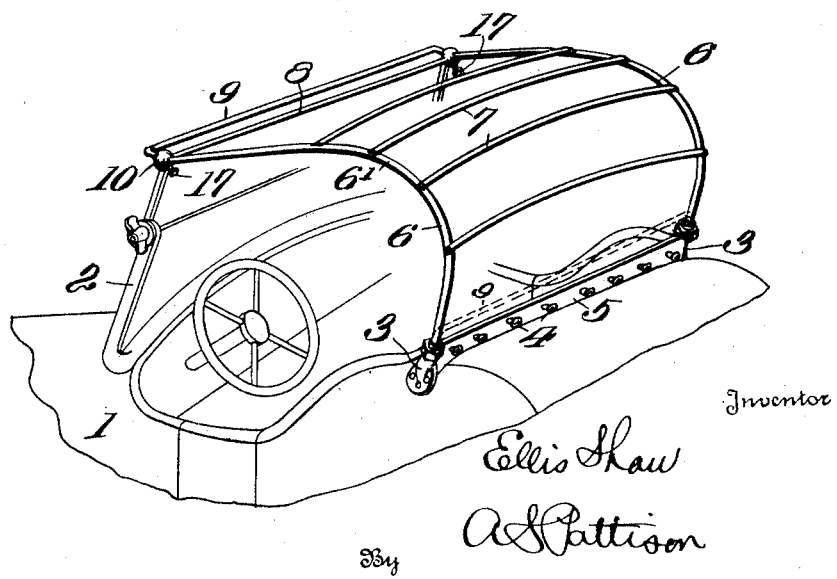

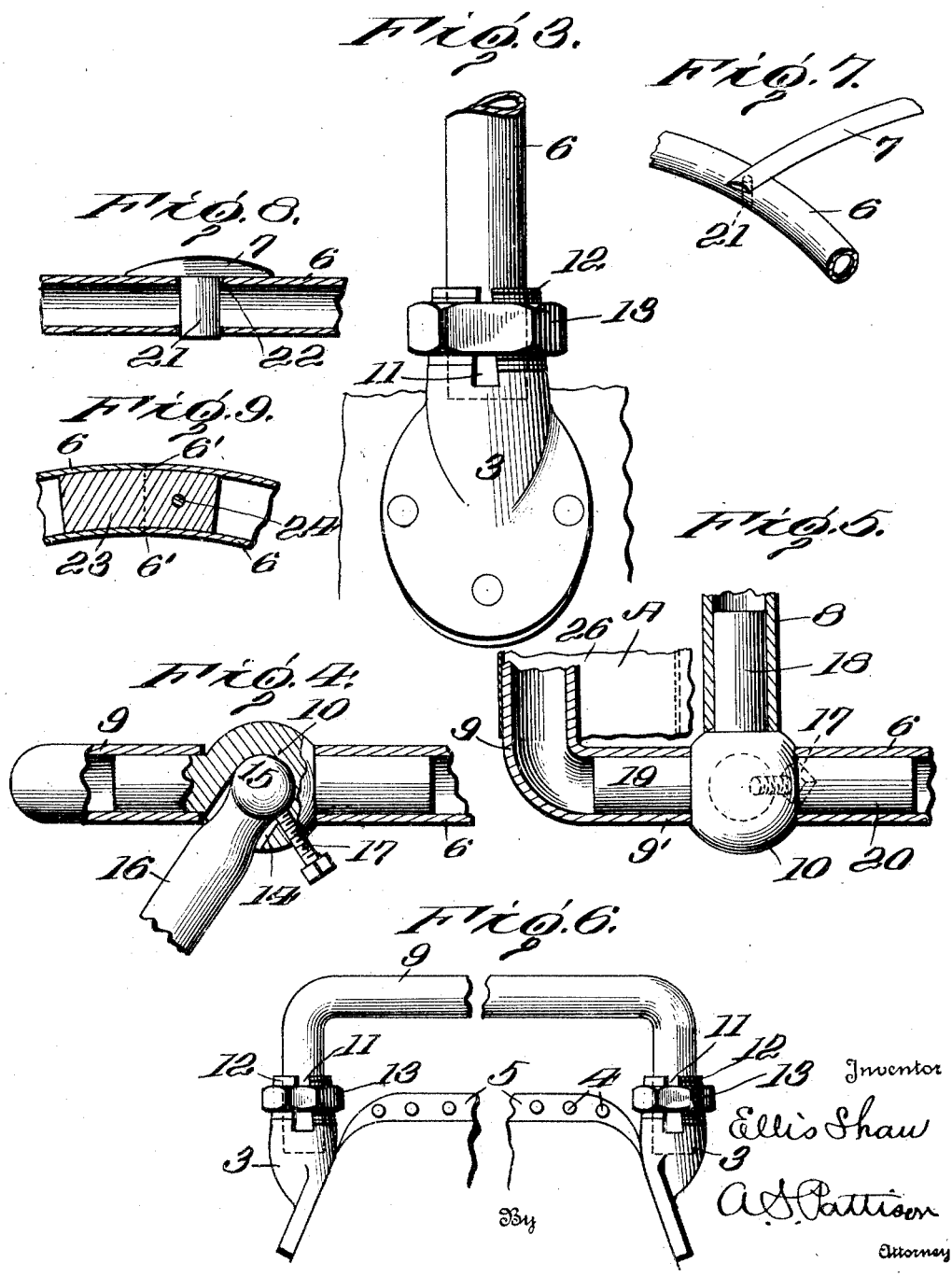

UNITED STATES PATENT OFFICE.

ELLIS SHAW, OF KITTANNING, PENNSYLVANIA.

AUTOMOBILE-TOP.

1,373,207.

Specification of Letters Patent.  Patented Mar. 29, 1921.

Application filed October 28, 1919. Serial No. 334,003.

*To all whom it may concern:*

Be it known that I, ELLIS SHAW, a citizen of the United States, residing at Kittanning, in the county of Armstrong and State of Pennsylvania, have invented certain new and useful Improvements in Automobile-Tops, of which the following is a specification, reference being had therein to the accompanying drawing.

My invention relates to improvements in automobile tops, and is of the type particularly adapted for automobile roadsters.

The primary object of my invention is to provide a detachable top for an automobile roadster, of simple and effective construction.

A further object of my invention is to construct a detachable top adapted to have its front end clamped to the top corners of an ordinary windshield, and its rear end detachably fitting in sockets on the body of the car just in rear of the top of the seat.

A further object of my invention is to make a detachable top in which all of the parts which constitute the top are separable from each other, so that the parts of the top when detached can be assembled in a bundle and placed in a small compartment of the car.

A further object of my invention is to so construct the frame of the top that the cover or fabric for the top will be placed under tension against all the separable parts and tightly holding them in their assembled positions, and at the same time serving to always keep the cover or fabric tight.

A further object of my invention is to so construct the frame of the top that the detachable vizor forming rod for the top will enter the top body sockets and serve as a robe-rail when the top is detached.

In the accompanying drawings—

Figure 1 is a perspective view of a portion of an automobile roadster showing my improved top in its operative position on the car.

Fig. 2 is a similar view with the fabric cover removed to expose the top frame with its parts in their assembled positions.

Fig. 3 is an enlarged view of one of the body sockets to receive the side bars of the top frame, a portion of one of the side bars shown in position therein.

Fig. 4 is a sectional view of one of the slotted corner sockets to receive the upper corners of a windshield with some of its coöperating parts assembled thereon.

Fig. 5 is a top plan view of one of the slotted corner sockets, showing the coöperating hollow bars or tubes in section and a part of the front looped end of the cloth or fabric cover.

Fig. 6 is a front elevation of the body sockets showing the vizor rod in position to serve as a robe-rail.

Fig. 7 is a detached perspective view of a part of one of the side bars of the frame and one end of one of the deachable frame cross-ribs.

Fig. 8 is a longitudinal sectional view taken through one of the side bars and showing the tenon connection of the cross-ribs therewith.

Fig. 9 is a longitudinal sectional view of one of the side bars at its separable central portion.

Referring now to the accompanying drawings, 1 is a part of an automobile roadster and 2 the wind-shield thereof. I desire it to be understood that my improved top may be applied to any design of automobile having the usual wind-shield, though it is particularly adapted for a roadster, and for that type having substantially the form of seat portion here shown.

In carrying out my invention, I attach to the sides of the body, just in rear of the top of the seat, two upwardly extending clamping sockets 3, and between these sockets a series of buttons 4 are located and applied to the body in any convenient and desired manner. As here shown, these buttons 4 are preferably on a horizontal bar 5, extending between the sockets 3, which bar is attached to the car in any suitable manner.

The frame of my top comprises two parallel side bars 6; a plurality of cross-ribs 7; a front cross-bar 8; a vizor bar 9 and wind-shield receiving corner sockets 10.

The side bars 6 are curved, as here shown, and have their rear ends entering the sockets 3. These sockets have their upper ends slotted or split as at 11, and are externally tapered and screw-threaded to receive the nuts 13, whereby the sockets are caused to tightly clamp the rear end of the side bars 6 in a detachable manner. The two corner sockets 10 are provided at their under sides with forwardly extending slots 14, to receive the upper corners 15 of the wind-shield 16.

These sockets are detachably connected with the corners of the wind-shield by suitable clamping screws 17.

The forward ends of the side bars 6; the opposite ends of the cross-bar 8 and the right angle ends 9' of the vizor bar 9 are all detachably connected with the corner sockets 10, by interlocking therewith. The manner here shown of accomplishing this, consists in making the bars of hollow material and providing the corner sockets with projections or tenons 18, to receive the bar 8; projections or tenons 19 to receive the hollow ends 9' of the vizor bar 9, and with rearwardly extending projections or pinions 20 to receive the hollow side bars 6.

The cross ribs 7 are detachably connected with the side bars 6 by providing the ends of the ribs with downwardly extending tenons 21, which detachably extend through openings 22 formed vertically through the side bars 6. For the purpose of shortening the side bars 6 when detached, they are made in two parts divided about at the center as at 6', the adjacent ends of these parts having a tenon 23 within their ends and lapping the joints 6', the tenon being secured in one of the separable parts of the side bars 6 in any suitable manner, as for instance, by a rivet 24.

From the foregoing description, it will be readily understood that the bars 6, 8 and 9 are separable from the corner sockets 10; that the rear ends of the side bars 6 are separable from the sockets 3; that the cross-ribs 7 are separable from the side bars 6, and that the sockets 10 are separable from the wind-shield 16. All of these separations are accomplished by telescoping constructions which more broadly stated may be aptly termed as interlocking connections.

The rear edge of the fabric cover A is provided with eyelets 25, to receive the buttons 4, and the front end of the fabric cover A is provided with a transverse loop or pocket 26, through which the vizor bar 9 passes. With the vizor bar in the top A, as shown in Fig. 5, and the rear ends of the side bars 6 in the sockets 3, the top A holds the cross-ribs 7 and the vizor bar 9 in position. The rear ends of the side bars 6 are vertically adjustable in the clamping sockets, whereby they are depressed in the sockets to enable the rear end of the top A to be readily buttoned, and are adjusted vertically to put the top under tension and thus serve to hold the cross-ribs and the vizor bar firmly and tightly in their positions against any rattling or loosening, and at the same time secure the top under tension and tight by simply adjusting upward the rear ends of the side bars 6.

A top of this character is adapted to be fitted to an automobile and when fitted to be conveniently assembled in position, and conveniently dissembled when desired and put in a relatively small compartment or space in the car. The top A can be used as a means in which to wrap the separated parts, thus forming an inclosure for them, and a relatively small bundle to be stored away in the car.

Having thus described my invention, what I claim and desire to secure by Letters Patent is—

1. The combination with an automobile having a wind-shield, of a detachable top comprising side bars extending upwardly and forwardly from the rear of the automobile seat, detachable members connected with the top corners of the wind-shield and receiving the front ends of the side bars, transverse ribs connecting the side bars, a front bar connected with the wind-shield detachable members, a fabric top having its front end connected with the front-cross-bar, its rear edge connected with the automobile body in rear of its seat, and contracting sockets carried by the automobile body for detachably and vertically adjustably receiving the rear ends of the side bars, whereby the fabric top may be put under tension by an adjustment of the side bars.

2. The combination with an automobile having a wind-shield, of a detachable top, comprising parallel side bars, vertically extending sockets attached to the automobile body in rear of its seat and adapted to detachably receive the rear ends of the side bars, sockets detachably connected with the front corners of the automobile wind-shield, the side bars extending upwardly and forwardly from the automobile body sockets and having their front ends connected with the detachable sockets, a vizor rod extending forward from the detachable sockets, cross-ribs, connecting the side bars and a fabric top having its front end connected with the vizor bar and its rear end attached to the automobile body in rear of its seat.

3. The combination with an automobile body having a wind-shield and upwardly extending sockets located in rear of the ends of its seat, of a detachable top comprising side bars having their rear ends detachably held in said sockets, the front ends of the side bars detachably connected with the top of the wind-shield, a U-shaped vizor bar extending forward of the top of the wind-shield and having its ends detachably connected with the front ends of the side bars, whereby when the parts are disassembled the vizor bar may be placed in the body sockets and act as a robe-rail.

4. The combination with an automobile body having a wind-shield and a seat, of a top comprising upwardly and forwardly extending side bars, means carried by the body in rear of the seat to which the rear ends of the side bars are vertically adjustably connected, wind-shield receiving sockets adapted to receive the upper edge of the windshield at its corners and provided with inwardly, forwardly and rearwardly extending projections, a front bar having its ends connected with the said projections, and a fabric top having its front end connected with the front cross-bar and its rear edge connected with the automobile body.

In testimony whereof I hereunto affix my signature.

ELLIS SHAW.